(12) United States Patent
Watts (10) Patent No.: US 12,521,798 B2
(45) Date of Patent: Jan. 13, 2026

(54) BIT HOLDER

(71) Applicant: MILWAUKEE ELECTRIC TOOL CORPORATION, Brookfield, WI (US)

(72) Inventor: Jeffrey M. Watts, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 388 days.

(21) Appl. No.: 18/127,389

(22) Filed: Mar. 28, 2023

(65) Prior Publication Data

US 2023/0311280 A1 Oct. 5, 2023

Related U.S. Application Data

(60) Provisional application No. 63/325,763, filed on Mar. 31, 2022.

(51) Int. Cl.
*B23B 31/107* (2006.01)
*B25B 23/00* (2006.01)

(52) U.S. Cl.
CPC ...... *B23B 31/1071* (2013.01); *B25B 23/0035* (2013.01); *B23B 2231/58* (2021.01); *Y10T 279/17196* (2015.01)

(58) Field of Classification Search
CPC .............. B23B 31/1071; B23B 31/107; B23B 2223/0035; B23B 2231/58; Y10T 279/17145; Y10T 279/17196
See application file for complete search history.

(56) References Cited

U.S. PATENT DOCUMENTS

| | | | | |
|---|---|---|---|---|
| 3,436,086 A | * | 4/1969 | Glenzer | B23G 1/46 |
| | | | | 279/75 |
| 3,583,715 A | | 6/1971 | Jahrl | |
| 3,767,218 A | * | 10/1973 | Linthicum | B23B 31/22 |
| | | | | 279/82 |
| 4,502,824 A | | 3/1985 | Dohse et al. | |
| 4,900,202 A | * | 2/1990 | Wienhold | B25B 23/0035 |
| | | | | 279/22 |
| 5,398,946 A | * | 3/1995 | Quiring | B25D 17/088 |
| | | | | 403/325 |

(Continued)

FOREIGN PATENT DOCUMENTS

| | | |
|---|---|---|
| DE | 202016101842 U1 | 4/2016 |
| DE | 202017103010 U1 | 6/2017 |

(Continued)

*Primary Examiner* — Nicole N Ramos
(74) *Attorney, Agent, or Firm* — Michael Best & Friedrich LLP (57) ABSTRACT

A bit holder includes a body, a spring, a retaining member, and a collar. The body includes a first end and a second end. The body defines a longitudinal bore configured to receive a tool bit and an opening in communication with the longitudinal bore. The spring is disposed on the body. The retaining member is disposed in the opening and is configured to selectively extend into the longitudinal bore to retain the tool bit within the longitudinal bore. The collar is disposed on the body and is biased toward the first end of the body by the spring. The collar is movable in a direction along the body against the spring to secure the tool bit within the longitudinal bore. The collar is movable further in the direction along the body against the spring to enable the bit holder to release the tool bit from the longitudinal bore.

20 Claims, 7 Drawing Sheets

(56) References Cited

U.S. PATENT DOCUMENTS

| | | | |
|---|---|---|---|
| 6,695,321 B2 * | 2/2004 | Bedi | B25B 23/0035 279/22 |
| 6,761,361 B2 | 7/2004 | Taylor et al. | |
| 6,953,196 B1 * | 10/2005 | Huang | B25B 23/0035 81/177.85 |
| 7,175,185 B2 | 2/2007 | Chen | |
| 7,469,909 B2 | 12/2008 | Strauch et al. | |
| 7,669,860 B2 | 3/2010 | Chiang | |
| 7,766,585 B2 | 8/2010 | Vasudeva et al. | |
| 7,922,180 B2 | 4/2011 | Meng | |
| 8,016,523 B2 | 9/2011 | Vasudeva et al. | |
| 8,172,236 B2 | 5/2012 | Shibata | |
| 8,844,942 B1 * | 9/2014 | Landowski | B25G 3/12 279/22 |
| 8,943,931 B2 | 2/2015 | Chiang | |
| 9,434,057 B2 * | 9/2016 | Funk | B25B 23/0035 |
| 10,286,456 B2 | 5/2019 | Shi et al. | |
| 10,343,266 B2 | 7/2019 | Zimmermann et al. | |
| 11,065,744 B2 | 7/2021 | Zimmermann et al. | |
| 2004/0081523 A1 | 4/2004 | Vasudeva et al. | |
| 2011/0049816 A1 * | 3/2011 | Hsu | B25B 23/0035 279/30 |
| 2012/0319398 A1 * | 12/2012 | Schweizer | B30B 15/026 285/308 |
| 2012/0326399 A1 * | 12/2012 | Lin | B25B 23/0057 279/75 |
| 2018/0326565 A1 * | 11/2018 | Wang | B25B 23/0035 |
| 2021/0107071 A1 | 4/2021 | Muto et al. | |
| 2021/0308842 A1 | 10/2021 | Abbott | |
| 2021/0339362 A1 | 11/2021 | Zimmermann et al. | |
| 2022/0339712 A1 * | 10/2022 | Lin | B23B 31/1071 |

FOREIGN PATENT DOCUMENTS

| | | | |
|---|---|---|---|
| EP | 1688222 A1 | 8/2006 | |
| EP | 2067577 A1 | 6/2009 | |
| WO | WO-0066329 A1 * | 11/2000 | B25B 21/007 |

* cited by examiner

BIT HOLDER

CROSS-REFERENCE TO RELATED APPLICATIONS

This application claims priority to U.S. Provisional Patent Application No. 63/325,763, filed Mar. 31, 2022, the entire contents of which are incorporated herein by reference.

FIELD OF THE INVENTION

The present invention relates to bit holding devices for removably receiving tool bits.

BACKGROUND OF THE INVENTION

Rotary power tools typically include bit holding devices to allow the power tool to be used with any number of interchangeable tool bits. Such tool bit devices usually require two hands to change a tool bit, one hand to pull back on a collar of the bit holding device, and the other hand to insert/remove the tool bit from a bore. However, a two-handed action can be slow and inefficient, and thus, undesirable in some applications of power tool use.

SUMMARY OF THE INVENTION

The disclosure provides, in one aspect, a bit holder including a body, a spring, a retaining member, and a collar. The body includes a first end and a second end. The body defines a longitudinal bore configured to receive a tool bit and an opening in communication with the longitudinal bore. The spring is disposed on the body. The retaining member is disposed in the opening and is configured to selectively extend into the longitudinal bore to retain the tool bit within the longitudinal bore. The collar is disposed on the body and is biased toward the first end of the body by the spring. The collar is movable in a direction along the body against the spring to secure the tool bit within the longitudinal bore. The collar is movable further in the direction along the body against the spring to enable the bit holder to release the tool bit from the longitudinal bore.

The disclosure provides, in another aspect, a bit holder including a body, a spring, a collar, and a retaining member. The body includes a first end and a second end. The body defines a longitudinal bore configured to receive a tool bit and an opening in communication with the longitudinal bore. The spring is disposed on the body. The collar is disposed on the body and biased toward the first end of the body by the spring. The collar defines a first cavity and a second cavity that is axially offset and separated from the first cavity. The collar is movable along the body. The retaining member is positioned in the opening. The retaining member is selectively received in the second cavity to enable insertion of the tool bit into the longitudinal bore and is selectively received in the first cavity to enable removal of the tool bit from the longitudinal bore.

The disclosure provides, in another aspect, a bit holder including a body, a first retaining member, a second retaining member, a spring, and a collar. The body includes a first end and a second end. The body defines a longitudinal bore configured to receive a tool bit, a first opening in communication with the longitudinal bore, and a second opening spaced apart from the first opening and in communication with the longitudinal bore. The first retaining member is received in the first opening. The retaining member is configured to selectively retain the tool bit within the longitudinal bore. The second retaining member is received in the second opening. The spring is disposed on the body. The collar is disposed on the body and is biased toward the first end of the body by the spring. The collar is movable relative to the body between a first position, in which the tool bit is insertable into the longitudinal bore, a second position different from the first position, in which the tool bit is secured within the longitudinal bore, and a third position different from the first and second positions, in which the tool bit is removable from the longitudinal bore.

In some embodiments, the bit holder may be part of a rotary impact tool including an anvil. In such embodiments, the body is part of the anvil.

DETAILED DESCRIPTION OF THE DRAWINGS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
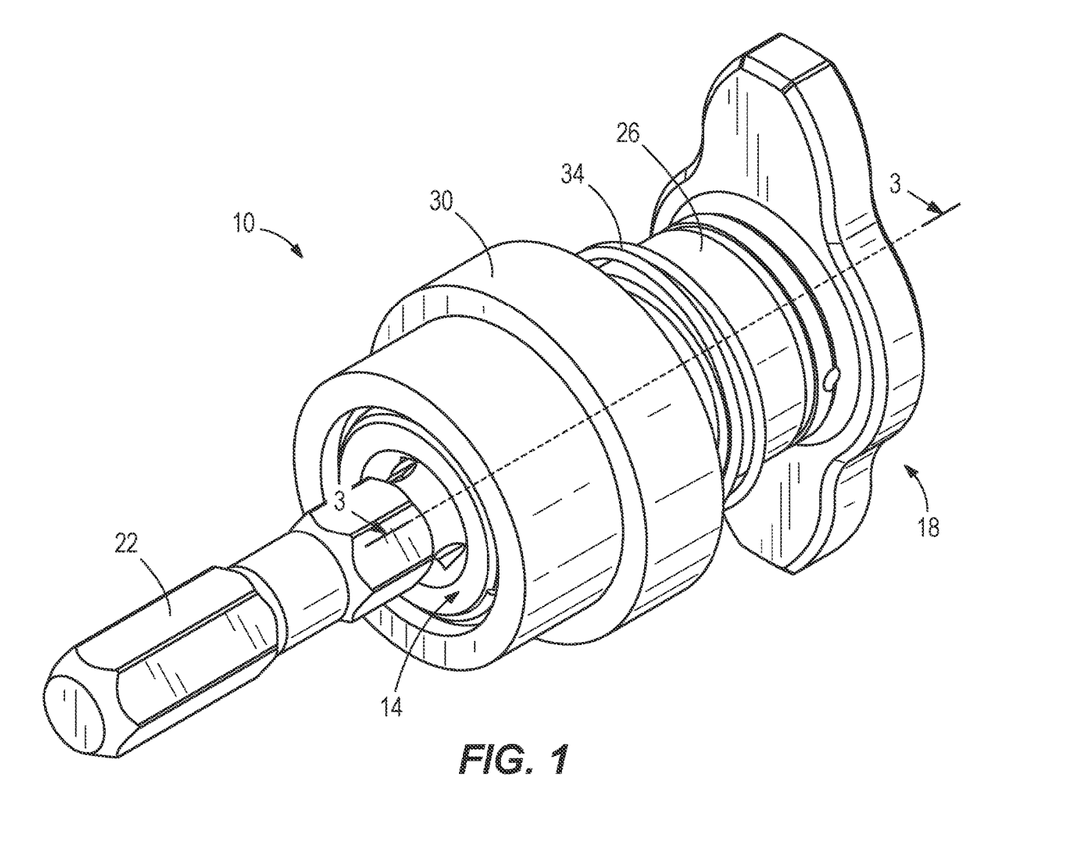
FIG. 1 is a perspective view of a bit holder and a tool bit.
Figure 2:
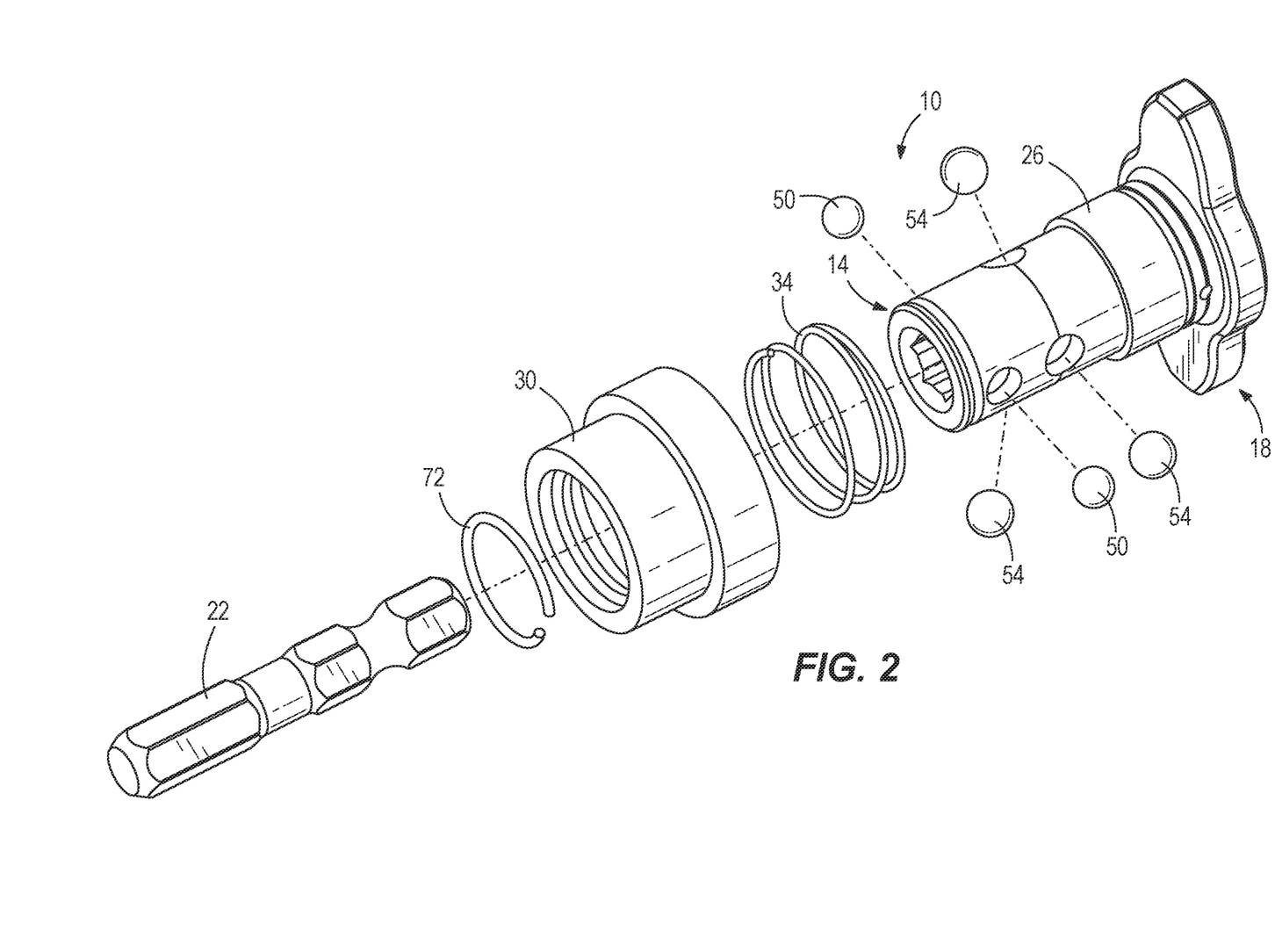
FIG. 2 is an exploded view of the bit holder and the tool bit of FIG. 1.

FIGS. 1 and 2 illustrate a bit holder 10. In some embodiments, the bit holder 10 may be part of a power tool such as a rotary drill, an impact driver, a hammer drill, or the like that is compatible and operable with a plurality of tool bits. In other embodiments, the bit holder 10 may be part of a hand tool or other structure. The bit holder 10 includes a first end 14 and a second end 18 with an axial direction defined therethrough. The bit holder 10 receives and retains a tool bit 22 at the first end 14. The bit holder 10 receives output from a drive mechanism (not shown) of the power tool at the second end 18. When the tool bit 22 is secured at the first end 14, the drive mechanism may transmit a driving force to the second end 18 of the bit holder 10 to drive operation of the tool bit 22.

The bit holder 10 further includes a body 26, a collar 30, and a spring 34. In the illustrated embodiment, the body 26 is an anvil of a rotary impact tool. The body 26 receives the tool bit 22 in a longitudinal bore 38. In the illustrated embodiment, the longitudinal bore 38 has a hexagonal cross-section for compatibility with the tool bit 22. In other embodiments, the longitudinal bore 38 may be shaped differently, such as having a circular cross-section, for compatibility with other types of tool bits. The collar 30 surrounds the body 26. The collar 30 is slidably coupled to the body 26 such that the collar 30 is slidable between a plurality of positions. Specifically, the spring 34 biases the collar 30 toward the first end 14 of the bit holder 10 in a first position (i.e., a bit receiving position). The illustrated spring 34 is a coil spring wrapped around a portion of the body 26 between the collar 30 and a shoulder (or other structure) on the body 26. In other embodiments, other suitable springs may also or alternatively be employed. The collar 30 may be moved against the bias of the spring 34 to a second position (i.e., a bit locking position) and a third position (i.e., a bit releasing position). In other embodiments, the collar 30 may be movable to further positions that provide different functionalities with the tool bit 22 than the first, second, and third positions.

Figure 3:
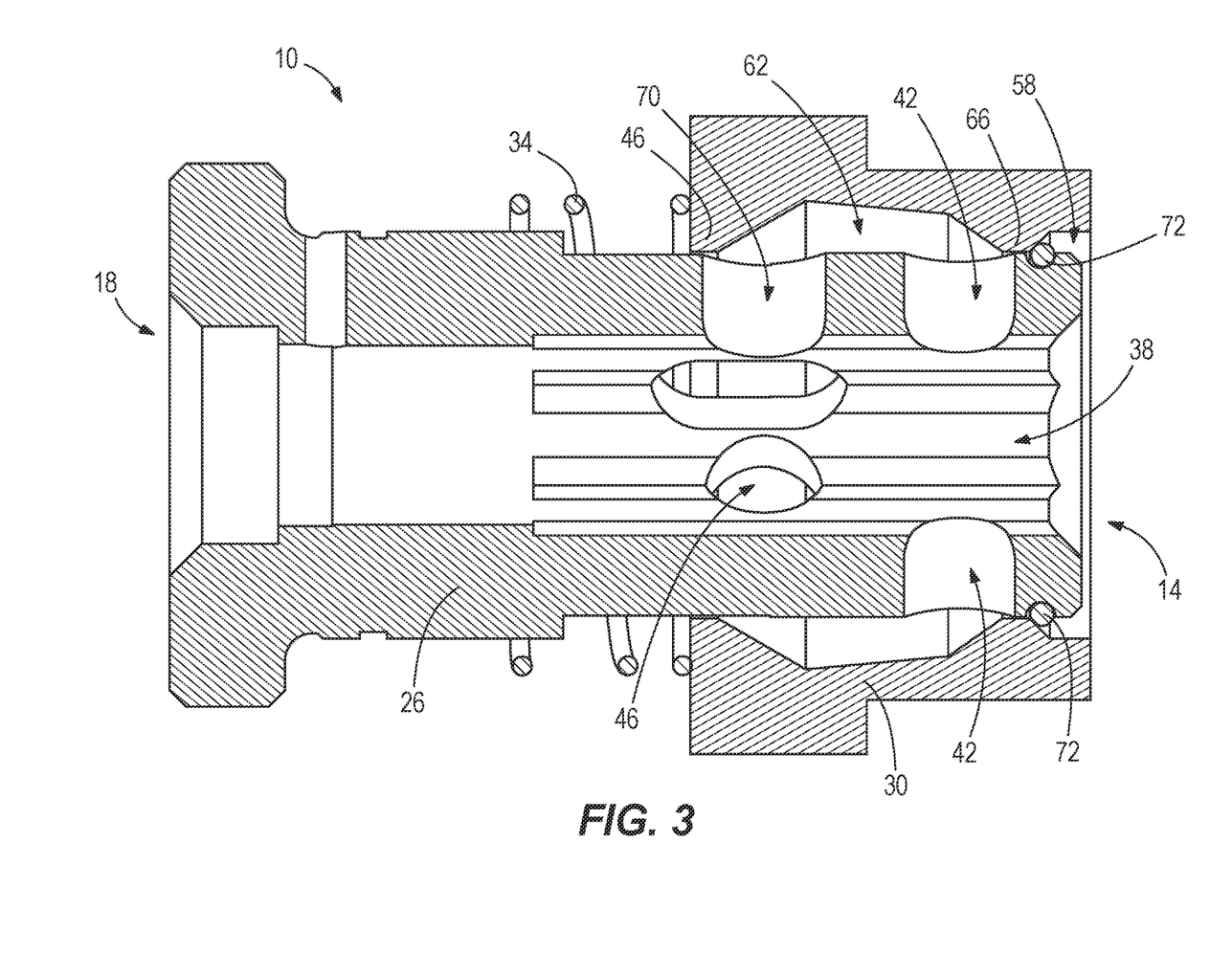
FIG. 3 is a cross-sectional view of the bit holder of FIG. 1 taken along line 3-3.
Figure 5:
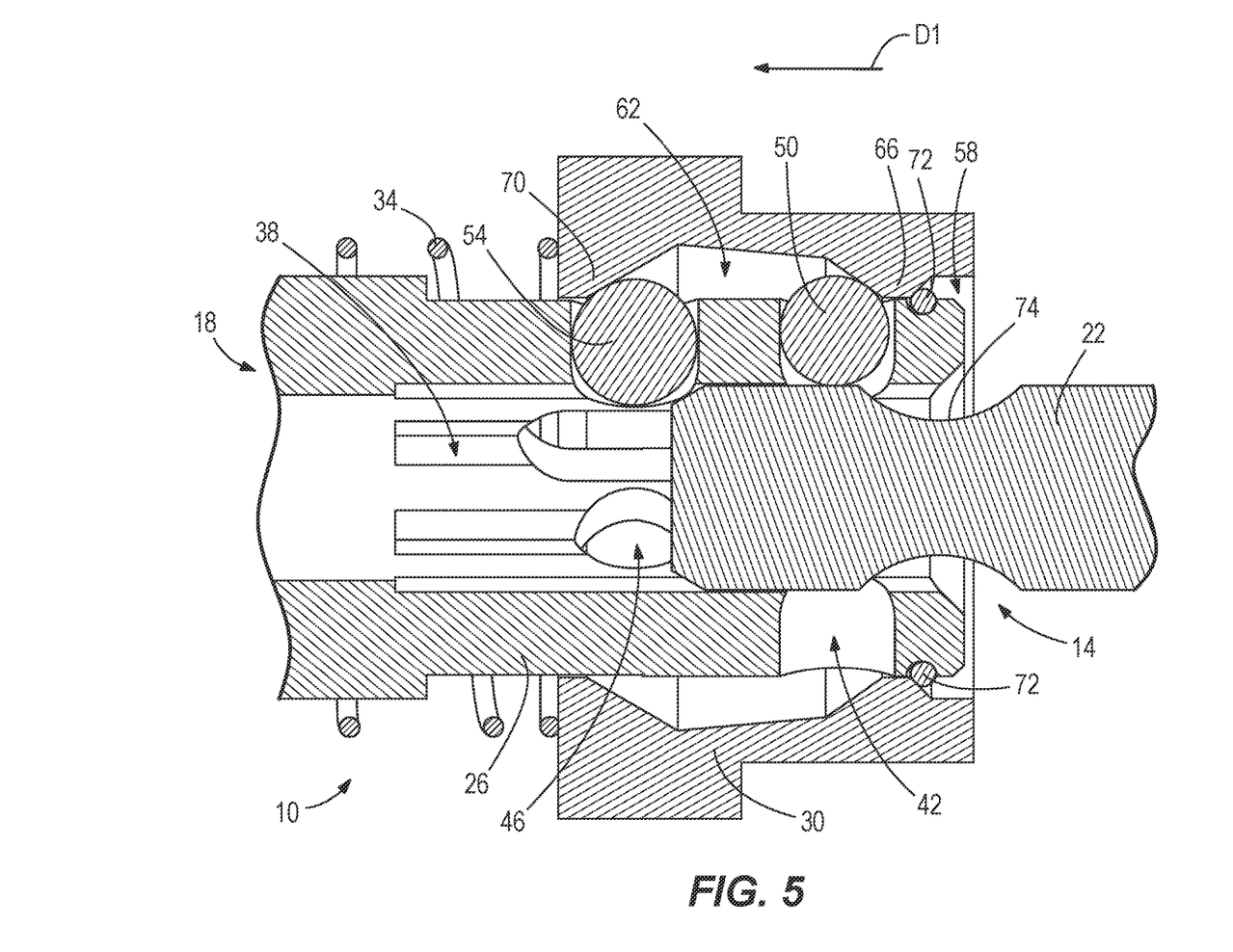
FIG. 5 is a cross-sectional view of the bit holder and the tool bit of FIG. 1 in a first position.

As seen in FIG. 3, the body 26 includes a plurality of openings 42, 46. More specifically, the body 26 includes a first opening 42 and a second opening 46. The first opening 42 and the second opening 46 extend from the longitudinal bore 38 through a wall of the body 26. The first opening 42 is positioned adjacent the first end 14 of the bit holder 10. As illustrated in FIG. 5, the second opening 46 is positioned between the second end 18 of the bit holder 10 and the first opening 42. The first opening 42 is configured to receive a first retaining member 50, and the second opening 46 is configured to receive a second retaining member 54. In the illustrated embodiment, the first and second retaining members 50, 54 are ball detents or spheres. In other embodiments, the first and second retaining members 50, 54 may have other configurations. The first retaining member 50 is configured to selectively extend into the longitudinal bore 38 to retain the tool bit 22 within the longitudinal bore 38. The second opening 46 has a larger diameter than the first opening 42 such that the second opening 46 is configured to receive a larger retaining member than the first opening 42. As such, the second retaining member 54 is larger than (e.g., has a larger diameter than) the first retaining member 50.

Figure 4A:
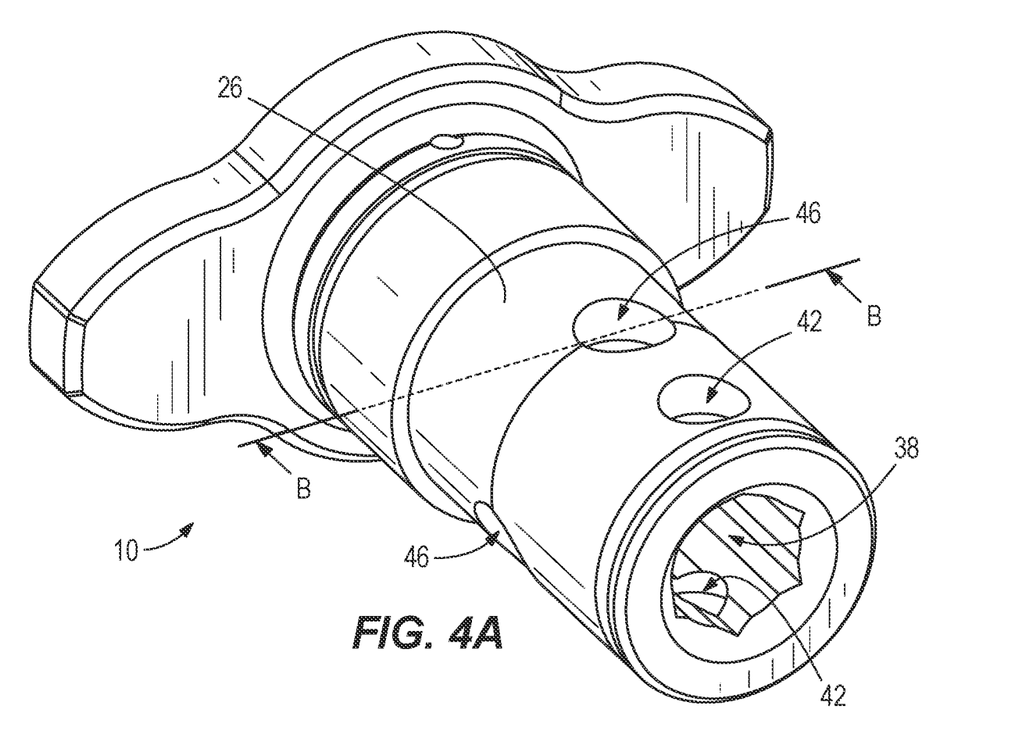
FIG. 4A is a perspective view of a body of the bit holder of FIG. 1.
Figure 4B:
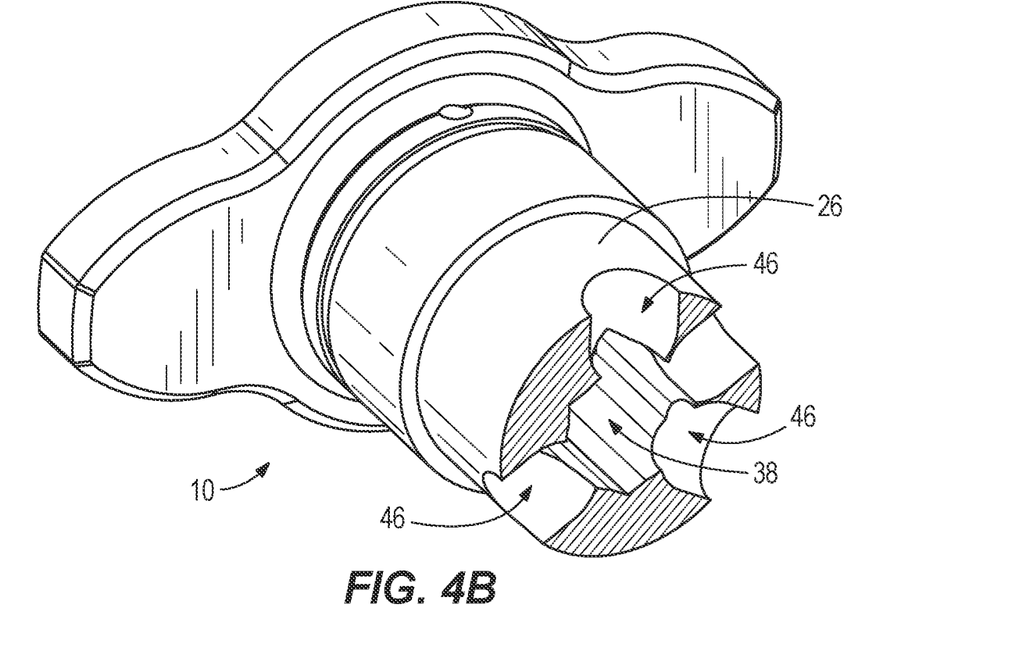
FIG. 4B is a cross-sectional view of the body of the bit holder of FIG. 4A taken along line B-B.

As illustrated in FIGS. 4A and 4B, in the illustrated embodiment, the first opening 42 is one of a plurality of first openings 42, and the second opening 46 is one of a plurality of second openings 46. Specifically, the plurality of first openings 42 includes two first openings 42, and the plurality of second openings 46 includes three second openings 46. Each of the plurality of first openings 42 is spaced circumferentially apart from the other of the first openings 42 at a first axial location on the body 26. Specifically, each of the first openings 42 is diametrically opposed from the other of the first openings 42. Each of the plurality of second openings 46 is spaced circumferentially apart from the other of the second openings 46 at a second axial location on the body 26. With reference to FIG. 5, each of the plurality of first openings 42 is configured to receive a corresponding first retaining member 50 such that the bit holder 10 includes two first retaining members 50, although only one first retaining member 50 is shown in FIG. 5. Each of the plurality of second openings 46 is configured to receive a corresponding second retaining member 54 such that the bit holder 10 includes three second retaining members 54, although only one second retaining member 54 is shown in FIG. 5. As such, the two first retaining members 50 and the three second retaining members 54 provide multiple points of contact along the circumferential groove 74 of the tool bit 22 when the tool bit 22 is in the second position, thereby helping center a tool bit within the bit holder 10, improving the retention strength of the bit holder 10, and inhibiting run out (i.e., how far the tool bit 22 rotates off a true axis of rotation). In some embodiments, the bit holder 10 may include fewer or more retaining members 50, 54.

The collar 30 includes a first cavity 58, a second cavity 62, a first ridge 66, and a second ridge 70. The first and second cavities 58, 62 are recesses that selectively receive the retaining members 50, 54. The first and second ridges 66, 70 are protrusions that selectively engage the retaining members 50, 54. In the illustrated embodiment, the first cavity 58 and the second cavity 62 are circumferential grooves formed on an inner surface of the collar 30. In other embodiments, the first cavity 58 and the second cavity 62 may be discrete recesses formed on the inner surface of the collar 30. The first cavity 58 is smaller than the second cavity 62. The first cavity 58 opens toward the first end 14 of the bit holder 10. The second cavity 62 is located between the first ridge 66 and the second ridge 70. The first ridge 66 is positioned between the first cavity 58 and the second cavity 62. The second ridge 70 is positioned at an end of the collar 30 closest to the second end 18 of the bit holder 10. In the illustrated embodiment, the first ridge 66 and the second ridge 70 extend circumferentially around the inner surface of the collar 30 and define a portion of the first and second cavities 58, 62. In other embodiments, the first ridge 66 and the second ridge 70 may be discrete protrusions extending from the inner surface of the collar 30.

Figure 6:
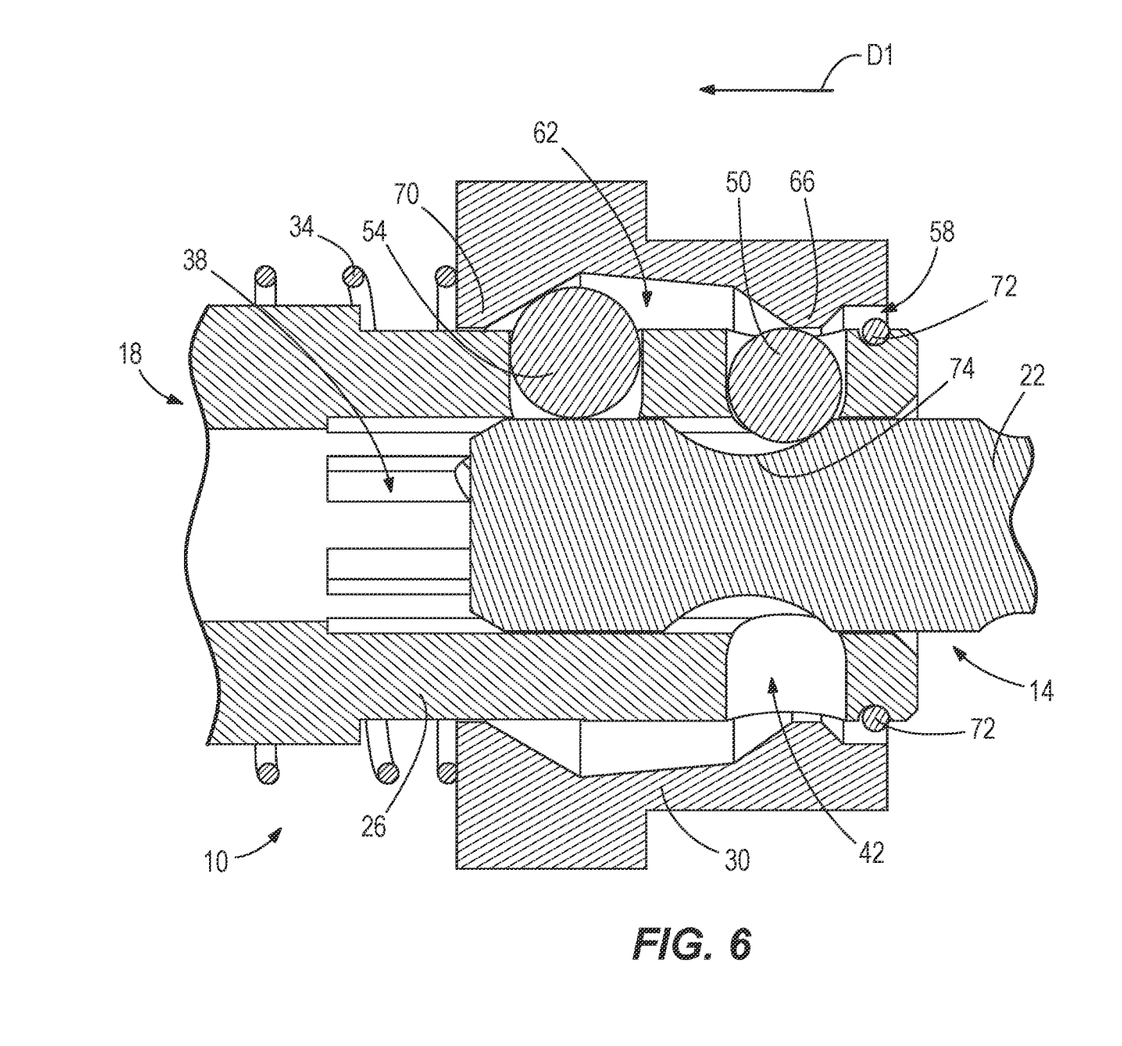
FIG. 6 is a cross-sectional view of the bit holder and the tool bit of FIG. 1 in a second position.
Figure 7:
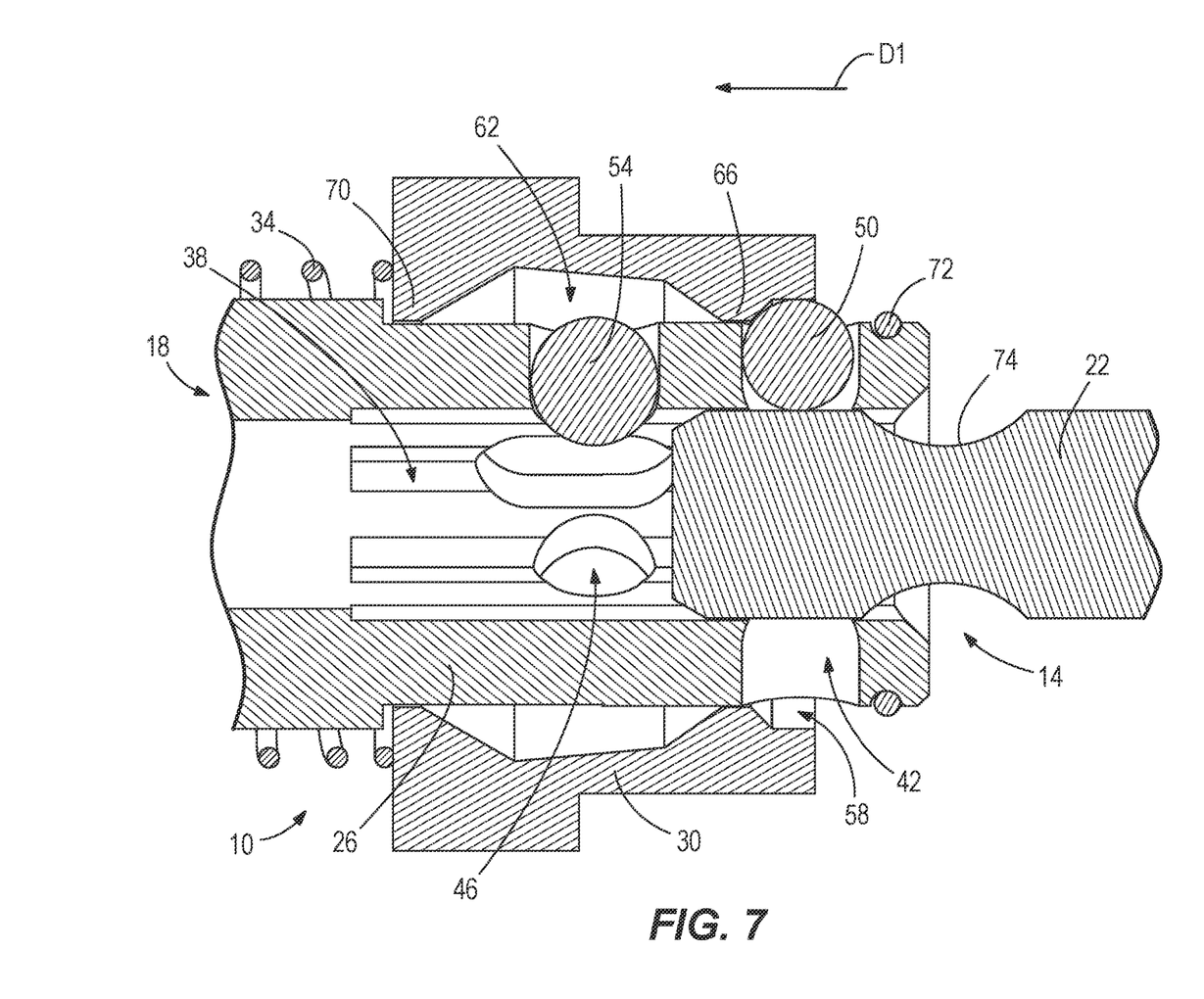
FIG. 7 is a cross-sectional view of the bit holder and the tool bit of FIG. 1 in a third position.

When the collar 30 is in the first position, as illustrated in FIG. 5, both the first retaining member 50 and the second retaining member 54 are partially received in the second cavity 62. In this position, the first ridge 66 engages a stop ring 72 coupled to the first end 14 of the body 26 to inhibit the collar 30 from sliding off of the body 26. As such, the stop ring 72 is positioned adjacent to the first end 14 of the bit holder 10 and extends at least partially within the first cavity 58 when the collar 30 is in the first position. When the collar 30 is in the second position, as illustrated in FIG. 6, the first ridge 66 pushes the first retaining member 50 partially into the longitudinal bore 38 such that only the second retaining member 54 is partially received in the second cavity 62. In other words, the first ridge 66 inhibits the first retaining member 50 from moving into the first cavity 58 and/or the second cavity 62. When the collar 30 is in the third position, as illustrated in FIG. 7, the first retaining member 50 is partially received in the first cavity 58, and the stop ring 72 is positioned outside of the first cavity 58. The second retaining member 54 remains aligned with the second cavity 62.

In operation, to secure the tool bit 22 within the body 26, the collar 30 starts in the first position (FIG. 5). A user inserts the tool bit 22 into the longitudinal bore 38, pushing the tool bit 22 toward the first retaining member 50 and the second retaining member 54. As the user pushes the tool bit 22 toward the second end 18 of the bit holder 10, the tool bit 22 first pushes past the first retaining member 50. Due to the size of the second cavity 62, the first retaining member 50 can move radially outward and away from the longitudinal bore 38. The tool bit 22 then engages the second retaining member 54. Specifically, an end of the tool bit 22 pushes the second retaining member 54 against the second ridge 70, thereby pushing collar 30 in a direction D1 toward the second end 18 of the bit holder 10 against the bias of the spring 34. That is, the collar 30 moves in a direction along the body 26 against the bias of the spring 34. As the collar 30 moves toward the second end 18, the first ridge 66 engages the first retaining member 50 to push the first retaining member 50 radially inward toward the longitudinal bore 38. Specifically, the first retaining member 50 is pushed into a circumferential groove 74 of the tool bit 22. The collar 30 is thus placed in the second position (FIG. 6) such that the tool bit 22 is secured to the bit holder 10.

To release the tool bit 22, the user grasps the collar 30 and pulls the collar 30 in the direction D1 toward the second end 18 against the bias of the spring 34. This action moves the collar 30 to the third position (FIG. 7) in which the first ridge 66 moves past the first opening 42, allowing the first retaining member 50 to be partially received in the first cavity 58. With the first retaining member 50 removed from the circumferential groove 74 and partially moved into the first cavity 58, the user can remove the tool bit 22 from the longitudinal bore 38 of the bit holder 10. Once the tool bit 22 has been removed from the longitudinal bore 38, the user may release the collar 30 such that the spring 34 then biases the collar 30 back to the first position (FIG. 5).

Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. A bit holder comprising:
    a body including a first end and a second end, the body defining a longitudinal bore configured to receive a tool bit and an opening in communication with the longitudinal bore;
    a spring disposed on the body;
    a retaining member disposed in the opening and configured to selectively extend into the longitudinal bore to retain the tool bit within the longitudinal bore; and
    a collar disposed on the body and biased toward the first end of the body by the spring;
    wherein the collar is movable in a direction along the body against the spring to secure the tool bit within the longitudinal bore, and wherein the collar is movable further in the direction along the body against the spring to enable the bit holder to release the tool bit from the longitudinal bore.

2. The bit holder of claim 1, wherein the opening is a first opening and the retaining member is a first retaining member, wherein the body further defines a second opening in communication with the longitudinal bore and positioned between the first opening and the second end of the body, and wherein the bit holder further comprises a second retaining member positioned in the second opening.

3. The bit holder of claim 2, wherein, in response to insertion of the tool bit into the longitudinal bore, the second retaining member moves the collar in the direction against the spring.

4. The bit holder of claim 3, wherein the second retaining member is larger than the first retaining member.

5. The bit holder of claim 2, wherein the first opening is one of a plurality of first openings, and the first retaining member is one of a plurality of first retaining members such that each of the plurality of first openings is configured to receive a corresponding one of the plurality of first retaining members.

6. The bit holder of claim 1, wherein the collar defines a first cavity positioned adjacent to the first end of the body and a second cavity positioned between the first cavity and the second end of the body, and wherein the retaining member is selectively receivable in the first cavity and the second cavity as the collar moves along the body.

7. The bit holder of claim 1, wherein the collar is movable along the body and toward the second end of the body from a first position to a second position to secure the tool bit, and wherein the collar is movable further along the body and toward the second end of the body from the second position to a third position to release the tool bit.

8. The bit holder of claim 1, further comprising a retaining ring adjacent to the first end of the body that inhibits removal of the collar from the body.

9. A bit holder comprising:
    a body including a first end and a second end, the body defining a longitudinal bore configured to receive a tool bit and an opening in communication with the longitudinal bore;
    a spring disposed on the body;
    a collar disposed on the body and biased toward the first end of the body by the spring, the collar defining a first cavity and a second cavity that is axially offset and separated from the first cavity, the collar movable along the body; and
    a retaining member positioned in the opening, the retaining member being selectively received in the second cavity to enable insertion of the tool bit into the longitudinal bore and being selectively received in the first cavity to enable removal of the tool bit from the longitudinal bore.

10. The bit holder of claim 9, wherein the collar is movable along the body from a first position to a second position, wherein the retaining member is partially received in the second cavity when the collar is in the first position, and wherein the retaining member is partially received in the first cavity when the collar is in the second position.

11. The bit holder of claim 10, wherein the opening is a first opening and the retaining member is a first retaining member, wherein the body further defines a second opening in communication with the longitudinal bore and positioned between the first opening and the second end of the body, and wherein the bit holder further comprises a second retaining member positioned in the second opening.

12. The bit holder of claim 11, wherein both the first retaining member and the second retaining member are partially received in the second cavity when the collar is in the first position.

13. The bit holder of claim 10, wherein the collar is movable along the body to a third position, and wherein the collar includes a protrusion that inhibits the retaining member from moving into the first cavity and the second cavity when the collar is in the third position.

14. The bit holder of claim 9, further comprising a retaining ring axially aligned with the first cavity that inhibits removal of the collar from the body.

15. The bit holder of claim 9, wherein the first cavity is formed at an end of the collar such that the first cavity has an opening that faces toward the first end of the body.

16. A bit holder comprising:
    a body including a first end and a second end, the body defining a longitudinal bore configured to receive a tool bit, a first opening in communication with the longitudinal bore, and a second opening spaced apart from the first opening and in communication with the longitudinal bore;
    a first retaining member received in the first opening, the first retaining member configured to selectively retain the tool bit within the longitudinal bore;
    a second retaining member received in the second opening;
    a spring disposed on the body; and
    a collar disposed on the body and biased toward the first end of the body by the spring, the collar being movable relative to the body between a first position, in which the tool bit is insertable into the longitudinal bore, a second position different from the first position, in which the tool bit is secured within the longitudinal bore, and a third position different from the first and second positions, in which the tool bit is removable from the longitudinal bore.

17. The bit holder of claim 16, wherein the collar defines a first cavity and a second cavity that is axially offset and separated from the first cavity, wherein the first retaining member is at least partially received in the second cavity when the collar is in the first position, and wherein the first retaining member is at least partially received in the first cavity when the collar is in the third position.

18. The bit holder of claim 16, further comprising a retaining ring disposed on an outer surface of the body that inhibits removal of the collar from the body, wherein the retaining ring extends at least partially within the first cavity when the collar is in the first position.

19. The bit holder of claim 18, wherein the retaining ring is positioned outside of the first cavity when the collar is in the third position.

20. The bit holder of claim 16, wherein the first opening is one of a plurality of first openings, and the first retaining member is one of a plurality of first retaining members such that each of the plurality of first openings is configured to receive a corresponding one of the plurality of first retaining members.

* * * * *